US008831284B2

(12) United States Patent
Thueux et al.

(10) Patent No.: US 8,831,284 B2
(45) Date of Patent: Sep. 9, 2014

(54) OBJECT IDENTIFICATION FROM IMAGE DATA CAPTURED FROM A MOBILE AERIAL PLATFORMS

(75) Inventors: Yoann Paul Georges Thueux, Cwmbran (GB); Nicholas Laurence Carter, Bristol (GB)

(73) Assignee: BAE Systems PLC, London (GB)

( * ) Notice: Subject to any disclaimer, the term of this patent is extended or adjusted under 35 U.S.C. 154(b) by 200 days.

(21) Appl. No.: 13/509,940

(22) PCT Filed: Nov. 10, 2010

(86) PCT No.: PCT/GB2010/051872
§ 371 (c)(1),
(2), (4) Date: May 15, 2012

(87) PCT Pub. No.: WO2011/061524
PCT Pub. Date: May 26, 2011

(65) Prior Publication Data
US 2013/0108103 A1 May 2, 2013

(30) Foreign Application Priority Data

Nov. 18, 2009 (EP) ..................................... 09275109
Nov. 18, 2009 (GB) ..................................... 0920111.2

(51) Int. Cl.
*G06K 9/00* (2006.01)
*G06T 7/20* (2006.01)
*G06K 9/32* (2006.01)

(52) U.S. Cl.
CPC ..... *G06K 9/3233* (2013.01); *G06T 2207/30232* (2013.01); *G06T 7/206* (2013.01); *G06T 2207/20081* (2013.01); *G06K 9/0063* (2013.01); *G06T 2207/20048* (2013.01)
USPC ........................................................ 382/103

(58) Field of Classification Search
None
See application file for complete search history.

(56) References Cited

U.S. PATENT DOCUMENTS 6,364,026 B1 * 4/2002 Doshay ........................... 169/47
6,526,156 B1 * 2/2003 Black et al. ................... 382/103
2001/0036313 A1 11/2001 Briand et al.

(Continued)

FOREIGN PATENT DOCUMENTS

EP          2 030 152 A1    3/2009
WO    WO 2006/074289 A2    7/2006
WO    WO 2007/144580 A1   12/2007

OTHER PUBLICATIONS

Canals, Raphaël, et al. "A biprocessor-oriented vision-based target tracking system." Industrial Electronics, IEEE Transactions on 49.2 (2002): 500-506.*

(Continued)

*Primary Examiner* — Nirav G Patel
(74) *Attorney, Agent, or Firm* — Maine Cernota & Rardin

(57) ABSTRACT

An image processing method includes: capturing image data from a sequence of images of a scene from different but repeatable viewpoints; associating captured images with a respective viewpoint identification; tracking a region of interest in the sequence of images; performing an eigenspace projection for the respective images to calculate respective points in the eigenspace projection; and comparing the calculated points to points previously obtained for a reference image for substantially the same viewpoints. A change between a calculated point and a corresponding previously obtained point indicates a change in the image content of the region of interest between the corresponding captured image and the corresponding reference image for a substantially same viewpoint.

10 Claims, 6 Drawing Sheets

(56) References Cited

U.S. PATENT DOCUMENTS

2005/0094879 A1* 5/2005 Harville ............... 382/209
2006/0244827 A1 11/2006 Moya et al.
2009/0310820 A1 12/2009 Williams

OTHER PUBLICATIONS

Zhou, Quming, and J. K. Aggarwal. "Object tracking in an outdoor environment using fusion of features and cameras." Image and Vision Computing 24.11 (2006): 1244-1255.*

International Search Report (PCT/ISA/210) issued on Feb. 7, 2011, by the European Patent Office as the International Searching Authority for International Application No. PCT/GB2010/051872.
European Search Report for EP 09275109, dated Apr. 20, 2010.
United Kingdom Search Report for GB 0920111.2, dated Jan. 28, 2010.
K.J. Han et al., "Eigen-Image Based Video Segmentation and Indexing", International Conference on Image Processing, Oct. 26, 1997, pp. 538-541 (XP010254002).
S. Tokai et al., "Dynamic Wide-Area Scene Visualization Using an Active Camera", Systems and Computer in Japan, May 16, 2006, pp. 101-112, vol. 37, No. 8.

* cited by examiner

OBJECT IDENTIFICATION FROM IMAGE DATA CAPTURED FROM A MOBILE AERIAL PLATFORMS

FIELD OF THE INVENTION

The present invention relates to processing of image data that comprises images of a scene obtained from differing viewpoints, for example image data from a mobile platform, for example an unmanned aerial vehicle (UAV), or for example image data from a statically positioned camera that sweeps over a changing field of view.

BACKGROUND

Processing of dynamic image scenes is often carried out by a human operator visually monitoring a transmitted video feed. This can be tedious and hence lead to potentially high levels of human error, as well as being time-consuming and expensive.

Hence automatic image processing is desirable, to either fully detect events or items of interest, or to provide intermediate data (meta-data) alerting a human operator and/or further automatic processing to a possible detection of an event or item of interest.

However, although conventional automatic image processing techniques are available for use with sequences of images obtained from static viewpoints, such techniques cannot readily be applied to image data comparing a temporal sequence of images of a scene obtained from differing viewpoints (for example image data from a mobile platform, for example an unmanned aerial vehicle (UAV), or for example image data from a statically positioned camera that sweeps over a changing field of view), due to the image transformations that arise from the images in the sequence being from differing viewpoints.

SUMMARY OF THE INVENTION

In a first aspect, the present invention provides an image processing method, the method comprising: capturing image data from a sequence of images of a scene from different but repeatable viewpoints; associating captured images with a respective viewpoint identification; tracking a region of interest in the sequence of images; performing an eigenspace projection for the respective images to calculate respective points in the eigenspace projection; comparing the calculated points to points previously obtained for a reference image for substantially the same viewpoints; wherein a change between a calculated point and a corresponding previously obtained point indicates a change in the image content of the region of interest between the corresponding captured image and the corresponding reference image for the substantially same viewpoint.

The sequence of images of a scene from different but repeatable viewpoints may be captured by a mobile platform travelling over a repeatable path.

The respective viewpoint identification may be based on the position of the mobile platform when the image was captured.

Performing the eigenspace projection may comprise using a model space created by performing Principal Component Analysis.

Performing Principal Component Analysis may comprise using Singular Value Decomposition.

The method may comprise: a training process to create a model space for the eigenspace projection and as part of which the previously obtained points are obtained; and a change detection process as part of which the eigenspace projections for the newly captured images are performed and the comparison of the new points with the previously obtained points is performed.

A change may be detected by: determining a distance in the eigenspace projection between the calculated point and the corresponding previously obtained point, and comparing the determined distance to a distance-based threshold.

In a further aspect, the present invention provides an image processing apparatus, comprising: apparatus for capturing image data from a sequence of images of a scene from different but repeatable viewpoints; and one or more processors; the one or more processors being arranged to: associate captured images with a respective viewpoint identification; track a region of interest in the sequence of images; perform an eigenspace projection for the respective images to calculate respective points in the eigenspace projection; and compare the calculated points to points previously obtained for a reference image for substantially the same viewpoints; wherein a change between a calculated point and a corresponding previously obtained point indicates a change in the image content of the region of interest between the corresponding captured image and the corresponding reference image for the substantially same viewpoint.

The apparatus for capturing image data may be for carrying by a mobile platform arranged to travel over a repeatable path.

The respective viewpoint identification may be based on the position of the mobile platform when the image was captured.

Performing the eigenspace projection may comprise using a model space created by performing Principal Component Analysis.

Performing Principal Component Analysis may comprise using Singular Value Decomposition.

A change may be detected by: determining a distance in the eigenspace projection between the calculated point and the corresponding previously obtained point; and comparing the determined distance to a distance-based threshold.

In a further aspect, the present invention provides a computer program or plurality of computer programs arranged such that when executed by a computer system it/they cause the computer system to operate in accordance with any of the above mentioned aspects of a method.

In a further aspect, the present invention provides a machine readable storage medium storing a computer program or at least one of the plurality of computer programs according to the above aspect.

DETAILED DESCRIPTION

Figure 1:
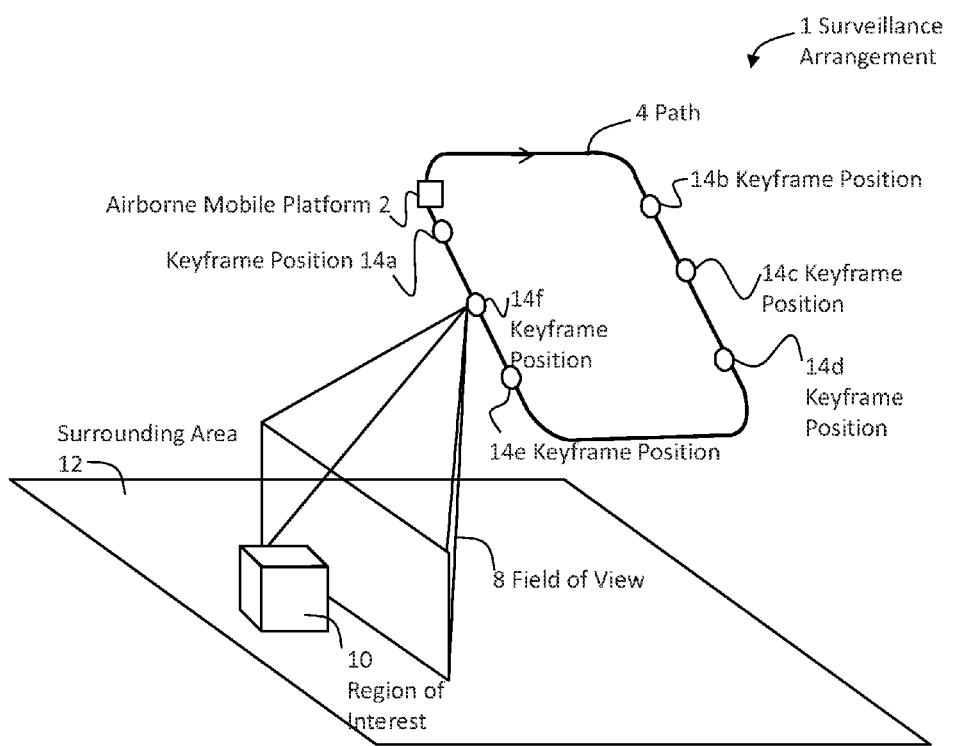
FIG. 1 is a schematic illustration (not to scale) of a surveillance arrangement in which an embodiment of the invention may be implemented.

FIG. 1 is a schematic illustration (not to scale) of a surveillance arrangement in which an embodiment of the invention may be implemented.

In the surveillance arrangement 1, an airborne mobile platform 2 travels repeatedly around a closed-loop surveillance path 4. The mobile platform 2 comprises a camera 6 (as shown schematically in FIG. 2) that captures image data as the mobile platform travels around the surveillance path 4. In this example the mobile platform is carried on the surveillance path 4 by an unmanned aerial vehicle (UAV) (not shown in FIG. 1). At each position the camera has a respective field of view 8 (one such field of view 8 for one such position on the surveillance path 4 is shown by way of example in FIG. 1). In this example a region of interest (ROI) 10 within a surrounding area 12 is determined and monitored, as will be described in more detail later below. The ROI 10 may, for example, be a specific building and an area of land immediately surrounding the building. In this example the surveillance path 4 flown by the UAV is in the form of a racetrack pattern at a distance of 6000 meters above the ground and at a distance of 6000 meters away from the ROI 10, giving a look-down angle of 45°. This means that a flight-path accurate to within GPS accuracy will create imagery accurate in the order of 0.1% of the distance to target (assuming a 6 metre GPS error).

Also shown in FIG. 1 by way of example are specific points on the surveillance path 4 which may be termed key frame positions, and whose purpose will be described in more detail later below. In practice there will be a relatively large number of such points on a given surveillance path, for example five hundred, however for ease of explanation only six specific points (indicated respectively by reference numerals 14a-f) are shown in FIG. 1 and will be used by way of example to describe the processes of the arrangement. In this example the mobile platform 2 travels along the surveillance path 4 in a clockwise direction, i.e. in the directional sense that is from key frame position 14a to key frame position 14b to key frame position 14c to key frame position 14d to key frame position 14e to key frame position 14f to key frame position 14a and so on.

Figure 2:
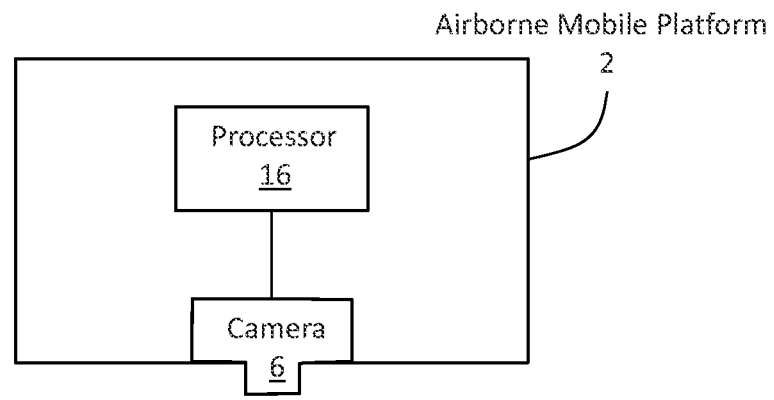
FIG. 2 shows further details of a mobile platform shown in FIG. 1.

FIG. 2 shows further details of the mobile platform 2. The mobile platform 2 comprises a processor 16 and a camera 6 which are coupled together. The processor 16 is arranged to perform various image data and other control processes which will be described in more detail later below. In this example the camera 6 is carried on a gimballed rig with mechanical and electrical vibration cancellation components, which provide a repeatability accuracy of less than 1 pixel. In this example the camera has a magnifying lens. The camera footprint provides a relationship of approximately 1.6 meters in the ground area to 65 pixels in the camera image of the ground area. This relationship allows that there are sufficient pixels on a target to enable motion detection.

Figure 3:
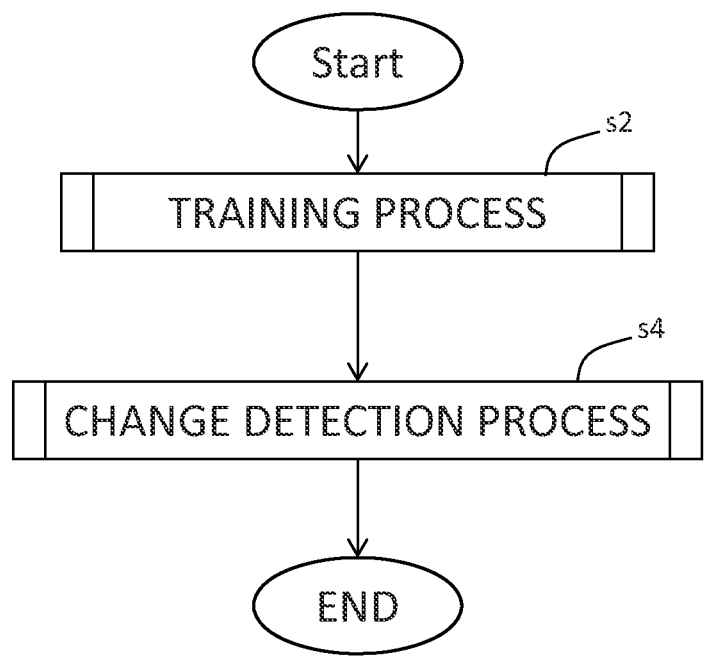
FIG. 3 is a process flowchart showing certain process steps implemented in an embodiment of an image processing method carried out for the surveillance arrangement of FIG. 1.

FIG. 3 is a process flowchart showing certain process steps implemented in an embodiment of an image processing method carried out for the surveillance arrangement 1 described above.

At step s2 a training process is performed, and thereafter at step s4 a detection process is performed. Details of these steps will be described later below with reference to FIG. 8 (showing details of step s2) and FIG. 9 (showing details of step s4), however before that an overview of the method will now be described.

Figure 4:
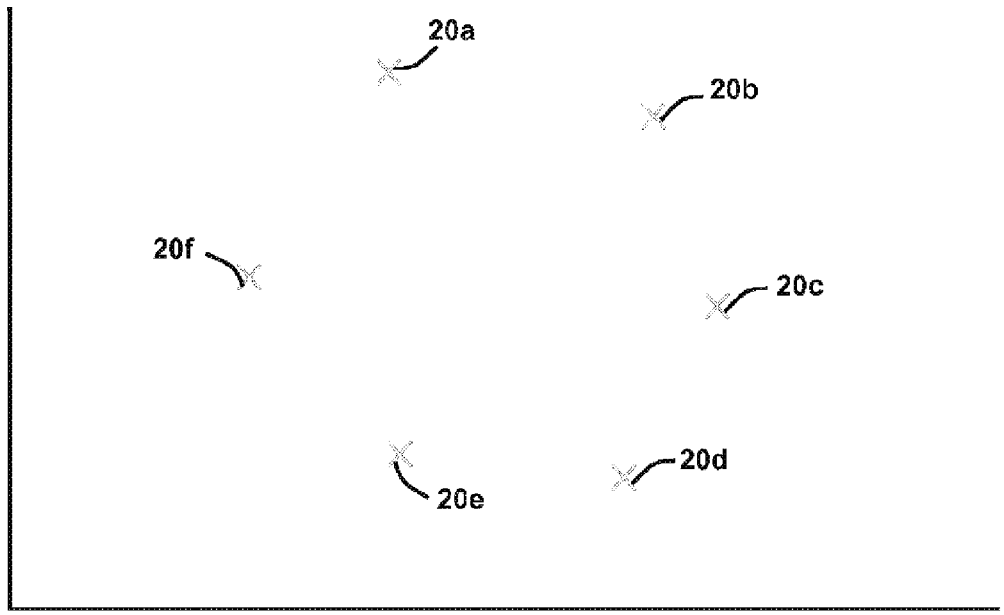
FIG. 4 shows schematically a representation of an eigenspace projection.
Figure 10:
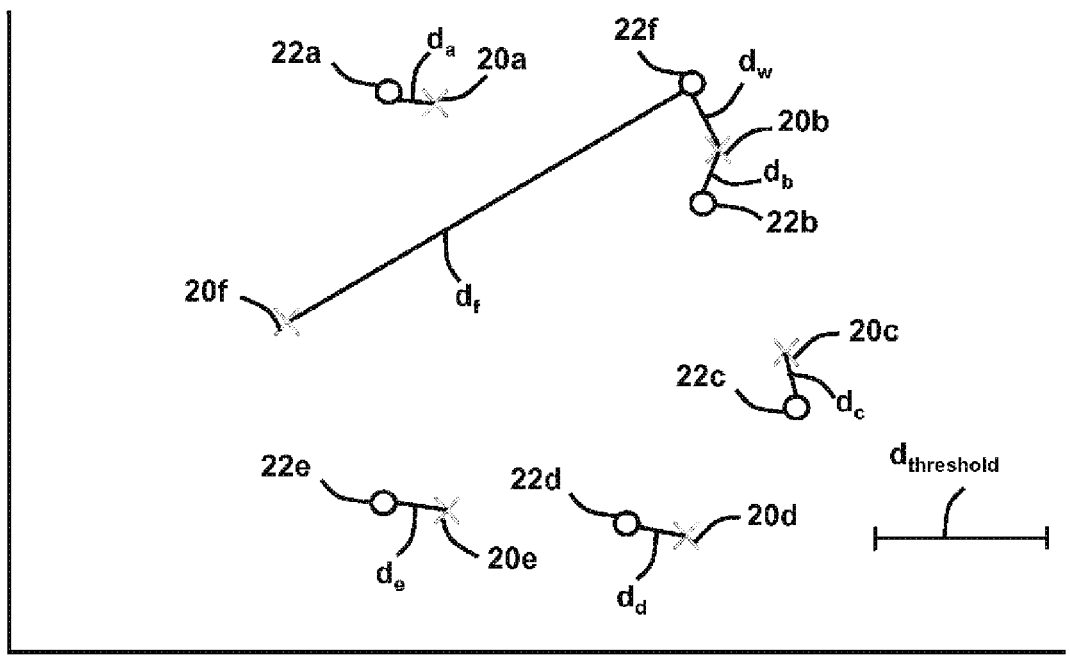
FIG. 10 shows schematically a scenario where an eigenspace point is moved away from a correct reference point but near to a wrong reference point.

In overview, during the training process s2, the mobile platform 2 performs a complete loop of the surveillance path 4 whilst capturing images in sequence, in particular for each key frame position 14a-f, but also for other positions between the key frame positions 14a-f. Furthermore, the mobile platform 2 is able to record, register, determine, tag or otherwise associate a viewpoint identification for a given image, the viewpoint identification being in this example the position of the mobile platform 2 as determined by GPS. The ROI 10 is tracked, so that the captured images all contain the ROI 10. As part of the training process s2, the captured data image for the ROI 10 is compressed using an eigenspace decomposition projection process to simplify the data, resulting in a projection in eigenspace. FIG. 4 shows schematically a representation of such an eigenspace projection. The eigenspace projection comprises a respective point 20a-20f in the eigenspace derived for each key frame position 14a-14f, i.e. the eigenspace point 20a is derived for the key frame position 14a, the eigenspace point 20b is derived for the key frame position 14b, and so on. In practice the eigenspace projection comprises many dimensions, e.g. thirty dimensions, however in FIG. 4 (and later in FIGS. 5, 7 and 10 also) a two-dimensional conceptual schematic representation of a nominal eigenspace projection is shown for ease of explanation purposes. The eigenspace projection (shown in FIG. 4) provided by the training process s2 may conveniently be termed the reference eigenspace projection and the respective points 20a-20f in the eigenspace may conveniently be termed reference points 20a-20f. Each point 20a-20f is thus associated with its viewpoint identification, i.e. in this embodiment the position the mobile platform 4 was at (i.e. the respective key frame position 14a-f) when the image (from which the point is derived) was captured.

Figure 5:
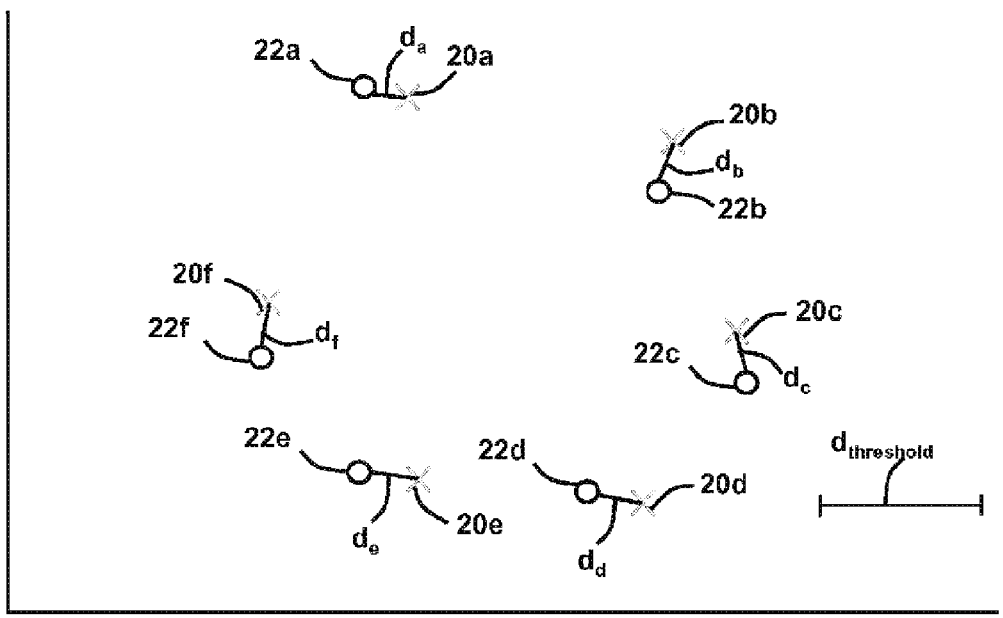
FIG. 5 shows schematically new current eigenspace points derived for key frame positions on a given loop of travel around a surveillance path shown in FIG. 1.

Once the training process s2 has been completed, i.e. the reference eigenspace projection has been formed, the detection process s4 can be performed. In overview, during the detection process s4, the mobile platform 2 performs further loops of the surveillance path 4 whilst capturing images in sequence, in particular for each key frame position 14a-f. For each loop of travel, for each captured image (i.e. for the ROI 10) a new current eigenspace point is calculated (and is thus associated with its viewpoint identification i.e. the key frame position). FIG. 5 shows schematically, and by way of example, new current eigenspace points 22a-f derived respectively for the key frame positions 14a-14f on a given loop of travel around the surveillance path 4.

Further, as part of the detection process s4, the respective Euclidean distance between the current point 22a-f and the corresponding reference point 20a-f for each pair of current point/reference point is calculated, i.e. the distance $d_a$ between current point 22a and reference point 20a is calculated, also the distance $d_b$ between current point 22b and reference point 20b is calculated, also the distance $d_c$ between current point 22c and reference point 20c is calculated, also the distance $d_d$ between current point 22d and reference point 20d is calculated, also the distance $d_e$ between current point 22e and reference point 20e is calculated, and also the distance $d_f$ between current point 22f and reference point 20f is calculated. Each pair of current point/reference point comprises the current point and the reference point that share the same viewpoint identification i.e. the same key frame position.

In this embodiment the calculated distances $d_{a-f}$ are compared to a threshold distance $d_{threshold}$. If, as is the case in the example situation shown in FIG. 5, all the determined distances $d_{a-f}$ are less than the threshold distance $d_{threshold}$, then it is determined that there are no relevant changes between the images currently captured in the detection process s4 and the images captured previously in the training process s2. In the example situation shown in FIG. 5, this is because we are indeed assuming there has been no physical change in the physical objects included in the ROI 10. It is noted that FIG. 5 schematically shows each current point 22a-f being a small distance (i.e. less than threshold distance) away from its corresponding reference point 20a-f. This is to show schematically that small variations may be present due to minor variations or operational errors, such as in actual positioning of the mobile platform 4 on the current loop compared to the training loop, or in determination of the current position compared to the positions determined during the training loop, or other statistical and practical errors and limits on repeatability, or indeed actual but minor changes in the scene being imaged. Nevertheless, these small variations are not treated as representing changes to be detected, due to forming distances $d_{a-f}$ that are less than the threshold distance $d_{threshold}$.

Further, as part of the detection process s4, changes in the scene at the ROI 10 that do represent a change significant for detection are detected. One scenario of such a change and detection will now be described in overview with reference to FIGS. 6 and 7.

Figure 6:
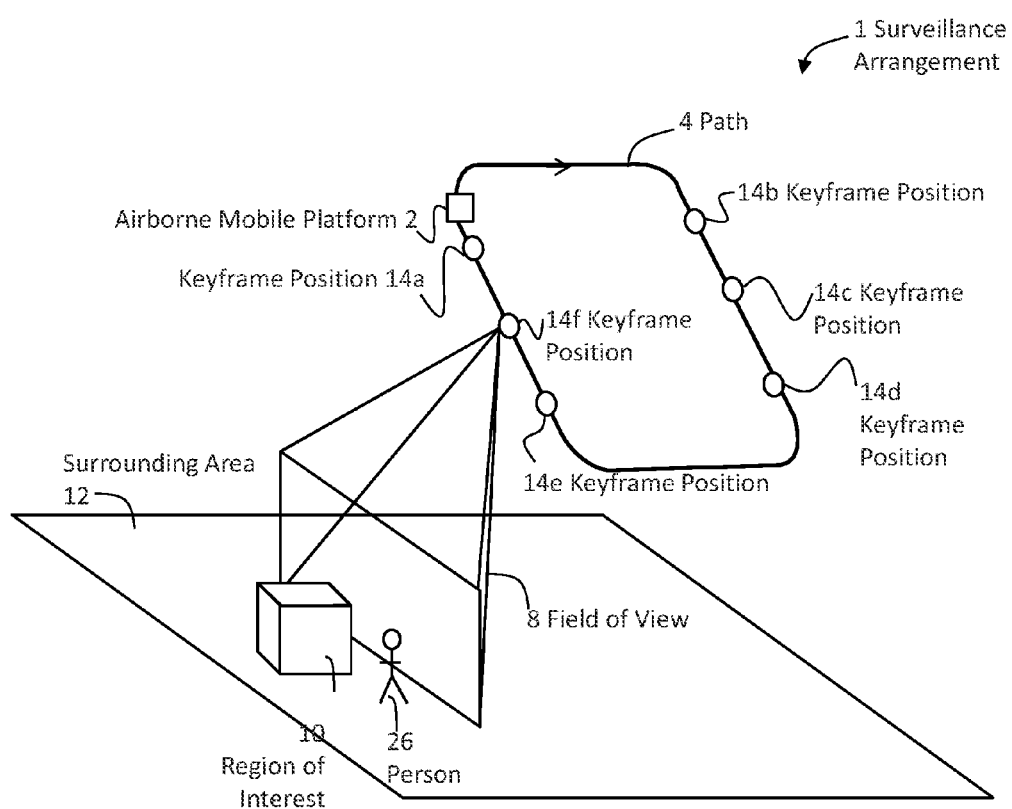
FIG. 6 is a further schematic illustration (not to scale) of the surveillance arrangement of FIG. 1 showing a scenario in which a change has occurred.

FIG. 6 is a further schematic illustration (not to scale) of the surveillance arrangement 1 showing a scenario for the above example in which a change has occurred, namely a person 26 has appeared within the ROI 10 during a detection process loop of travel. The other details of FIG. 6 are the same as, and are indicated by the same reference numerals, as was the case for FIG. 1. In this scenario, for ease of explanation let us assume the person appears somewhat rapidly, i.e. after the mobile platform 4 captured an image at key frame position 14e but before the mobile platform captures an image at key frame position 14f.

Figure 7:
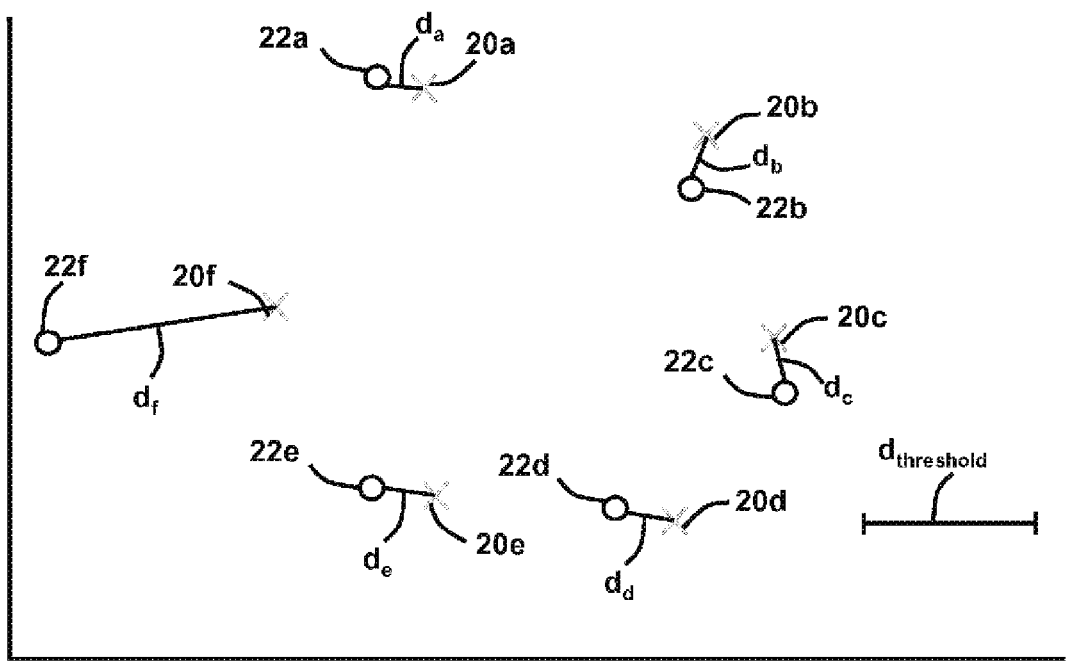
FIG. 7 shows schematically new current eigenspace points derived for the key frame positions shown in FIG. 1 in the change scenario shown in FIG. 6.

FIG. 7 shows schematically the new current eigenspace points 22a-f derived respectively for the key frame positions 14a-14f in the present change scenario on this loop of travel around the surveillance path 4. FIG. 7 further shows the respective calculated Euclidean distances $d_{a-f}$ between the current point 22a-f and the corresponding reference point 20a-f for each pair of current point/reference point in the present change scenario on this loop of travel around the surveillance path 4. As is shown schematically in FIG. 7, in this scenario, due to the relatively significant physical change (due to the presence of the person 26) in the image acquired at key frame position 14f compared to the images obtained at the previous key frame positions 14a-e of the current loop of travel, the new current eigenspace point 22f derived from the image captured at key frame position 14f is displaced a relatively large distance $d_f$ from the corresponding reference point 20f, whereas the other current eigenspace points 22a-e remain relatively close to their respective corresponding reference points 20a-e, i.e. with relatively small respective distances $d_{a-e}$. In particular the distance $d_f$ between the new current point 22f and the corresponding reference point 20f is larger than the threshold distance $d_{threshold}$, and hence it is determined that a change has been detected.

Further details of the training process s2 of FIG. 3 will now be described with reference to the process flowchart of FIG. 8, which shows process steps s6-s10 providing in combination the training process step s2.

At step s6, the image data is captured as described earlier above with reference to FIGS. 1 and 2. In this embodiment, images are taken in quick succession (for example, but not necessarily, as a video sequence) from the mobile platform 2 as the mobile platform 2 travels one loop of the surveillance path 4. Images are captured in particular for each key frame position 14a-f, and also for other positions between the key frame positions 14a-f.

At step s8, ROI tracking is performed. Within each of the images acquired at step s6, an ROI 10 will be present. This ROI 10 may be manually or automatically nominated, as an area worthy of further monitoring. This ROI 10 may move within the image as the mobile platform 2 changes position. To remove translation effects, the ROI tracking process is applied to the images to extract the ROI 10 and transform this image sub-section into a translation and scale invariant representation. The mobile platform 2 and the camera 6 are controlled to preferably keep the ROI 10 in the camera's field of view 8 throughout the travel of the mobile platform 2 along the surveillance path 4. If this is not entirely possible, then lower quality results are achieved, although the processes may nevertheless work well enough to represent a useful improvement over prior art approaches. In more detail, in this embodiment the ROI 10 is tracked using a self-adaptive discriminate based filtering system, as described in the patent application WO 2007/114580 A1 and EP07733135, the contents of which are incorporated herein by reference. This technique takes as input an image of the area to be tracked, then locates the same region in subsequent image frames. The technique uses self adaptive template matching on small image sub-sections. However, in other embodiments, other appropriate ROI tracking processes may be used instead of or in addition to the above described one.

At step s10, eigenspace projection is performed. Once images have been captured and processed by both the image capturing step s6 and the ROI tracking step s8 described above, the data is compressed using an eigenspace decomposition projection, resulting in a projection in eigenspace. As described earlier above, FIG. 4 shows schematically a representation of such an eigenspace projection. The eigenspace projection comprises a respective point 20a-20f (herein termed reference point(s) in the eigenspace derived for each key frame position 14a-14f. This step has the combined effect of simplifying the data, speeding up searching, and creating a comprehensive model of the affine perspective projection effects that can be encountered when observing the ROI 10 under surveillance. The reference points all have some positional data associated with them (thereby providing the viewpoint identification), for example global positioning satellite (GPS) or time sequence data. In more detail, in this embodiment, every nth image is used to create the eigenspace projection. The eigenspace projection provides a simplified model of the variation of the dataset. Typically the interval of images used to create this model space is approximately one frame in every 10 seconds of imagery (at 25 frames per second this would be 1:250). To create the model space, the set of selected images are subjected to Principal Component Analysis (PCA), using Singular Value Decomposition (SVD). Such a process is well known to, readily implemented, by the skilled person (although it is noted such processes are not conventionally applied to changing images, rather they are conventionally applied in e.g. feature recognition processes for static images). In overview, this process comprises the following:

find the mean representation of the ROI (average grey level values);
  compute how each image in the training set differs from the mean image (co-variance of each image in matrix form);
  use SVD to find the mapping from the co-variance to the origin (returns a set of vectors to perform this mapping, called eigenvectors);
  find the mapping vectors that contain the most informative aspects of the information;
  using linear combination, project images in the initial run, (not just the images from the key frame positions but also images from positions therebetween—e.g. all the images being taken if this is not impractical/unnecessarily burdensome, i.e. every image it is chosen to make use of) into the compressed model space. (It is further noted that another possibility is to project only the images from the key frame positions.)

When all the reference points have been projected into the compressed model space, a compact representation of the background variation that can be expected as the airborne platform moves around the ground target has thereby been generated. Each reference point is also tagged with either a GPS location marker (or e.g. time information, relating to how much time has elapsed since the beginning of the flight-path).

Generally speaking, this step s10 of eigenspace projection provides a partitioning of the eigenspace and enables rapid searching (as will be described later below) of an otherwise prohibitively large space. Furthermore the eigenspace projection allows the effects of affine perspective projection to be accommodated.

By virtue of the above described steps s6-s10, the training process step s2 of FIG. 3 is implemented.

Further details of the change detection process s4 of FIG. 3 will now be described with reference to the process flowchart of FIG. 9, which shows process steps s12-s22 providing in combination the change detection process step s4.

At step s12, image capturing is performed. The mobile platform 2 performs further loops of the surveillance path 4 whilst capturing images in sequence, in particular for each key frame position 14a-f. The capturing of a specific image per se is as described above for step s6 of the training process. However, in this embodiment a more general difference with the image capturing of step s12 over that of step s6 is that images are not captured at positions between the key frame positions 14a-f. Moreover, although in this embodiment at step s12 images are captured for all of the key frame positions 14a-f, this need not be the case, and in other embodiments images are only captured for some of the key frame positions.

At step s14, ROI tracking is performed, in the same manner as described above for step s8 of the training process.

At step s16, for each loop of travel, for each captured image (i.e. for the ROI 10) a new current eigenspace point is calculated, using the model already developed in the training process. As described earlier above, FIG. 5 shows schematically, and by way of example, new current eigenspace points 22a-f derived respectively for the key frame positions 14a-14f on a given loop of travel around the surveillance path 4.

Given that it would be desirable to have a complete model of the views that are likely to be encountered during a surveillance loop, encoding all of the affine changes inherent in this path, and the fact that currently this space is not tractably searchable when considered as a whole, the present inventors have instead provided a novel mechanism for reducing the search space. As every point in the eigenspace, the model has a GPS or time based marker associated with it (i.e. a viewpoint identification), and this marker can be stored in an ordered list (in this implementation, a hash list is used for added speed, although this is not essential). Therefore very quick look-up and matching can be achieved.

Hence at step s18, eigenspace matching is performed, in essence matching the eigenspace points calculated for the newly acquired images with the reference points calculated previously during the training process. In other words, a new tracked image from the surveillance path 4 is projected into the model space, which in itself is a very quick process, as it only involves multiplying the image by a small set of numbers (since the appropriate model has already been learnt/determined in the training process s2).

Thus in effect the corresponding positional information that is associated with the training and testing points is in effect used to partition the search space, and to disambiguate image differences that happen to result in eigenspace points that lie near other valid projection points.

Thus a measure of similarity can be made, which in this embodiment is performed as follows.

At step s20, the GPS or timing information associated with the test image is used to locate the spatially nearest point in the model space, i.e. the reference point that corresponds to a particular newly captured image eigenspace point. (In other embodiments the number of spatially closest points considered may be greater than one, typically between 1 and 5. For example, due to inaccuracies in the GPS, time or camera images (judder, etc) the image tagged with the current GPS/time information may not be the best reference image to use, therefore if we use the closest n (e.g. 1 to 5) images, these inaccuracies may be alleviated or overcome.) The distance d between the model point returned by the GPS/time data and the newly captured image eigenspace point is then measured using simple Euclidean distance. If the calculated distance is below a predefined threshold $d_{threshold}$, then the captured image is determined as an "inlier", i.e. no image change is detected. If the calculated distance is equal to or greater than the threshold $d_{threshold}$, then the captured image is determined as an "outlier", i.e. an image change is detected. The value of the threshold $d_{threshold}$ can either be set before processing (then varied to select the amount of sensitivity), or for example may be learned in an ongoing manner using pattern analysis techniques.

As described earlier above, for test images with no significant change compared to the images captured during the training process, the eigenspace points 22a-f of the newly captured images will lie at or close to their corresponding reference points 20a-f, with resultant small distances $d_{a-f}$ therebetween that are all smaller than the threshold distance $d_{threshold}$, as shown schematically in FIG. 5, and hence no image change is detected.

However, as also described earlier above, for a test images that does have a significant change compared to the corresponding reference image captured during the training process, the eigenspace points 22f of the newly captured image will lie at a greater distance $d_f$ away from the corresponding reference points 20f, to an extent that the resultant distances $d_f$ between the newly captured image eigenspace point 22f and its corresponding reference point 20f is greater than the threshold distance $d_{threshold}$, as shown schematically in FIG. 7, and hence an image change is detected.

Thus, in overview, by virtue of step s20 that comprises determining eigenspace distances and comparing to a threshold, based on either manually assigned or automatically generated threshold values, the distance between test data and training data projected into Eigenspace is analysed. If this distance measure is too far from the training data, i.e. from the corresponding reference data as determined by e.g. GPS position info of the mobile platform, then an image change is registered.

At step s22, meta-data is output. The meta-data indicates whether an image change was detected at step s20 or not. The meta-data may be in any appropriate form. For example, meta-data may be only output when an image change is detected, and then the meta-data may be in the form of an alert, along with details of the timing of the captured images or images that have been determined as showing change. Another possibility is meta-data is routinely output, confirming in a more routine fashion that no change has been detected, but then changing to an alarm or alert form when an image change is detected. Data may be associated with images to denote change or non-change.

The meta-data provided by step s22 may be in any form suitable for further processing by one or more further automatic processes, and/or may be output in a form suitable for presenting to a human operator. Another possibility is the meta-data may be stored before later being processed/reviewed.

By virtue of the above described steps s12-s22, the change detection process step s4 of FIG. 3 is implemented.

In the above example, when describing the (schematically represented) change in eigenspace position arising from a change in the image, i.e. by way of example the moving of the new eigenspace point $22f$ a relatively large distance away from its corresponding reference eigenspace point $20f$, the example has been shown such that the new test point $22f$ is not located anywhere that is particularly close to any of the other reference points $20a$-$e$ either. In practice, however, due the eigenspace projection being more densely populated than in the above simplified example, and due to being multi-dimensional, e.g. thirty-dimensional, often when there is an image change, the resulting eigenspace point will be moved a large distance away from its corresponding reference point, but will by chance (or due to a similarity in the eigenspace decomposition of the feature with that of the original object, e.g. the entry into the ROI of an object shaped like an existing object in the ROI but at a different point within the ROI) be located near to a different reference eigenspace point. An example of such a scenario is shown schematically in FIG. 10, where the test eigenspace point $22f$ from the newly acquired changed image is a large distance $d_f$ (i.e. greater than the threshold distance $d_{threshold}$) from its corresponding reference point $20f$, but is a relatively short distance $d_w$ (i.e. shorter than the threshold distance $d_{threshold}$) away from a different reference point, namely in this example the reference point $20f$. This would in practice lead to possible ambiguities, but this is in fact overcome by the above described embodiments, by virtue of it being possible to determine the correspondence between the respective eigenspace points from the newly acquired images and their reference points, due to the newly acquired images and the images that provided the reference eigenspace points, and hence likewise the new eigenspace points and the reference eigenspace points, being tagged or otherwise associated with corresponding positional (e.g. GPS-based) or timing information (e.g. time sequence data) with regard to where or when on the repeatable surveillance loop the mobile platform was when the respective new images and the respective corresponding training process images were captured. Thus, when the above described distance measures $d_{a-f}$ are close to some training data or other, but not the "correct" (i.e. correctly corresponding) training data, i.e. are in the wrong location as decided by the positional information, then an image change is registered.

The above embodiments advantageously reduce the amount of data to be stored and processed, hence allowing accommodation of the very large amounts of data that would otherwise arise due to the changing viewpoint of the scene being monitored. Furthermore, by performing eigenspace-based decomposition rather than other conventional types of image compression, the "compressed" data is simply in the form of eigenspace point identities, which are then readily and easily matched for detecting image change, whereas other compressed forms of image would require such compressed images to be compared as such, which would still be very processing and time hungry even for compressed images. Yet further, due to the use of a repeatable surveillance path or other form of repeatability of control over the different viewpoints to be imaged on successive loops of the surveillance path or sweep, combined with the retention of the viewpoint identification (e.g. based on the GPS position), possible ambiguities arising from an image change whose resulting eigenspace point is moved a large distance from its corresponding reference point but near to a different ("wrong") reference eigenspace point, are overcome i.e. disambiguated (as described above with reference to FIG. 10). This provides two further advantages—firstly image changes are not falsely missed, and secondly searching is dramatically speeded up as only the correct reference point has to be checked for any given newly acquired image point. Yet further, the use of eigenspace decomposition advantageously has synergy with the changing image capture viewpoints, since the fundamental directional information retention of eigenspace decomposition (by which e.g. "key" characteristics such as underlying shapes of image features are retained and emphasised) means that the differing viewing directions will tend to work into the eigenspace projection/representation including locating around a mean. Yet further, due to the use of eigenspace decomposition the above described embodiments tend to allow successful implementation even with grey scale images rather than colour images.

In the above embodiments, the training process is performed over the course of one (initial) loop of the surveillance path. However, this need not be the case. For example, in other embodiments training results from more than one loop may be used, for example averaging the training results. Another more general possibility is the training process can be based on an earlier acquired or otherwise pre-stored data set representing a predetermined reference starting situation (obtained, extrapolated or otherwise calculated from earlier sorties, and/or even from theoretical knowledge, e.g. maps or the like). An aspect of such possibilities is that they can be carried out in a relatively slow manner, but then when test loops are performed the processing can nevertheless still be carried out in pseudo real-time if desired.

Also, the training process is most accurately carried out if there is no activity in the ROI (i.e. that would cause image changes) happening during this training loop. However, these aspects need not be the case. For example, even if there is activity, although the training model may have some inaccuracy, nevertheless it will still tend to provide a form of "freeze-frame" version of the situation on the ground, in particular in the ROI, and consequently the change detection process that follows thereafter will still tend to provide detection of further changes compared to that freeze-frame starting situation. Another possibility is to perform multiple training loops and then subtract out any changes thereafter only processing the remaining static elements to provide the training eigenspace reference projection.

In the above embodiments, once the training process has been carried out for a first time, the resultant reference model/reference points are not changed thereafter during implementation of the change detection process. However, in other embodiments, the training process is repeated in full or part during implementation of the change detection process, in order to update or otherwise alter the resultant reference model/reference points. For example, the stored reference point for one or more of the stored key frame positions may be updated. This may be by adding an additional reference point for a given key frame position, or replacing the existing reference point. Another possibility is a reference point may be added for a new key frame position. The key frame position may be from within the existing surveillance path, or may arise because the surveillance path is altered in a controlled manner, hence usefully allowing additional key frame positions to be included in the process and/or requiring certain ones to be removed if they are at positions no longer covered by the altered surveillance path. Another possibility is that the reference points may need updating and/or adding/removing extra key frame positions due to environmental changes, e.g. due to the brightness changing and/or shadows changing, e.g. due to changing times of day and/or weather conditions etc.

Figure 8:
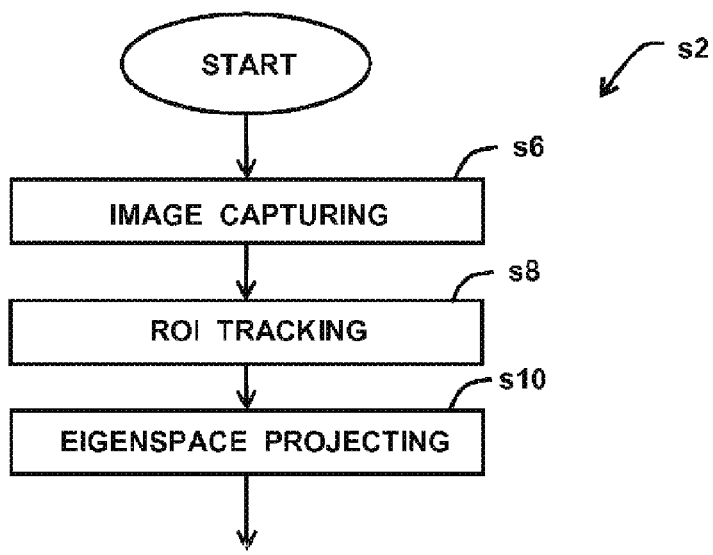
FIG. 8 is a process flowchart showing process steps that provide in combination a training process step of FIG. 3.
Figure 9:
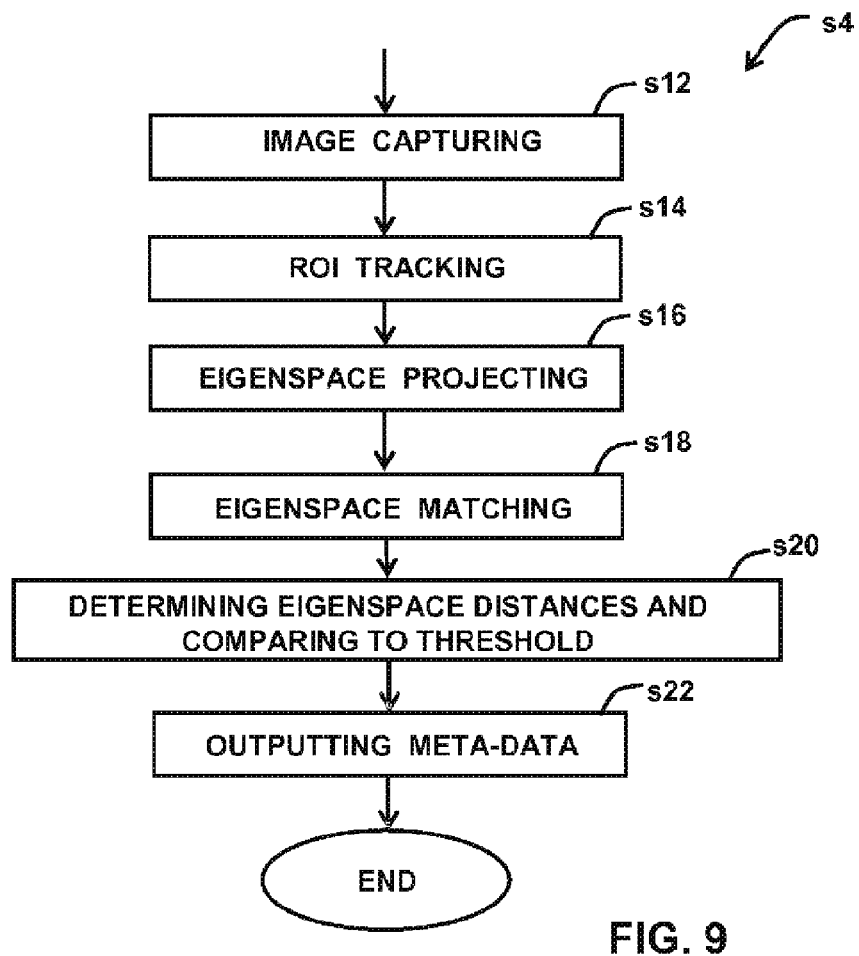
FIG. 9 is a process flowchart showing process steps that provide in combination a change detection process step of FIG. 3.

Generally speaking, in view of the considerations mentioned in the preceding paragraph, and in view of other considerations, it is to be appreciated that certain of the process steps depicted in the flowcharts of FIGS. 3, 8 and 9 and described above may be omitted or such process steps may be performed in differing order to that presented above and shown in FIGS. 3, 8 and 9. Furthermore, although all the process steps have, for convenience and ease of understanding, been depicted as discrete temporally-sequential steps, nevertheless some of the process steps may in fact be performed simultaneously or at least overlapping to some extent temporally. For example, as discussed in the preceding paragraph, the training process may be continued or repeated after the change detection process has been started. Another example is that within the training process and/or within the change detection process ROI tracking may be carried out on those images already captured by the image capturing step whilst the step of capturing images is carrying on to capture further images. Another example is that the eigenspace other steps in the change detection process may be carried out for test data that has so-far been acquired and processed whilst further such data is still being acquired and processed.

In the above embodiments the measure used to determine to what extent the eigenspace points from the newly acquired images match the reference points from the training process is the Euclidian distance in the eigenspace projection. However, this need not be the case, and in other embodiments other measures may be used, for example Mahalanobis distance.

In the above embodiments, a simple fixed distance threshold is used to assess whether it will be determined that an image change has occurred or not. However, in other embodiments other types of thresholds or threshold functions may be used, including for example more complex threshold functions and/or adaptive thresholds. For example, the requirement for determination that an alert is to be raised may be that a predetermined (or adaptive) number of eigenspace points in a given range of reference points must be over the threshold distance before an alert is raised. Another possibility is that if a first distance over the threshold distance is detected, then a next n number of comparisons will use an adapted lower threshold. It will be appreciated that many possibilities are available to the skilled person.

In the above embodiments the surveillance path is a racetrack-shaped route. However this need not be the case, and in other embodiments other route shapes may be used (and/or in the case of aerial travel altitude may also be varied in a controlled and repeatable manner—more generally, where GPS or other positional information is described above, such positional information may further include altitude). Such other route shapes may be irregular, or regular, examples of other regular possibilities being a circle, an ellipse, a figure of eight. In other examples (see the following paragraph where mobile platforms other than aerial transport are mentioned), the irregular route may be as required (as long as it is substantially repeatable), and may for example, be determined as a predetermined route along given roads or other predetermined carriageways e.g. railways.

In the above embodiments the mobile platform is, or is carried by, an UAV. However this need not be the case, and in other embodiments other types of vehicle or mobile platform may be used, for example an unmanned ground vehicle, an unmanned underwater vehicle and so on. Other possibilities are that the vehicle may be manned.

More generally, instead of a mobile platform as such, instead a statically located but sweeping or otherwise changing platform may be used that provides a changing viewpoint of a given ROI. For example, a closed circuit TV camera that sweeps a given surveillance view in a repeated and controlled fashion may be used.

In the above embodiments *the mobile platform comprises a camera with magnifying lens, and the camera is on a gimballed rig. However, these details need not be the case, and in other embodiments other types of camera/image acquisition apparatus may be used, and/or different types of rigs and other positioning and directing apparatus. The camera may be a visible light camera, or may be some other form of imaging apparatus, such as a thermal camera or X-ray apparatus.

In the above description the change of image detected is shown, by way of example, as the appearance of a person in the ROI. However, neither the above embodiments nor the invention more generally is limited to detecting that specific change, rather any image change is potentially detectable by the present invention, or at least by certain embodiments thereof. By way of example, other types of change that may be detected include the door of a house opening or closing, or a car moving, and so on.

In the above embodiments an eigenspace projection comprising thirty-dimensions is employed. This will typically retain, say, 90% of the information of the original images. However, this is not limiting, and in other embodiments, other n-dimension eigenspace projections may be employed, where n is a number other than thirty. If n is greater than thirty, a larger amount of information will typically be retained, thereby potentially giving more accurate results, but at a trade-off with increased processing requirement. Alternatively, if n is less than thirty, a lesser amount of information will typically be retained, thereby typically giving less accurate results, but with a trade-off benefit of requiring less processing.

Apparatus, including the processor 16, for performing the above arrangements and processes, and performing the method steps described above, may be provided by configuring or adapting any suitable apparatus, for example one or more computers or other processing apparatus or processors or other modules. Such apparatus may be located partly or totally at the mobile platform, or may be distributed at various locations with communications links therebetween. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. An image processing method, comprising:
   capturing image data from a sequence of images of a scene from different but repeatable viewpoints, capturing said image data with a mobile platform traveling over a repeatable path;
   associating captured images with a respective viewpoint identification based on a position of the mobile platform when the captured image was captured;
   tracking a region of interest in the sequence of images;
   performing an eigenspace projection for respective images of the sequence to calculate respective points in the eigenspace projection; and
   comparing a calculated point to a point previously obtained for a reference image for a same viewpoint;
   wherein a change between a calculated point and a corresponding previously obtained point indicates a change in image content of the region of interest between a corresponding captured image and a corresponding reference image for the substantially same viewpoint.

2. A method according to claim 1, wherein performing the eigenspace projection comprises:
   using a model space created by performing Principal Component Analysis.

3. A method according to claim 2, wherein performing Principal Component Analysis comprises:
   using Singular Value Decomposition.

4. A method according to claim 1, comprising:
   a training process to create a model space for the eigenspace projection and as part of which the previously obtained points are obtained; and
   a change detection process as part of which the eigenspace projections for newly captured images are performed and the comparing of the new points with the previously obtained points is performed.

5. A method according to claim 1, wherein a change is detected by:
   determining a distance in the eigenspace projection between a calculated point and a corresponding previously obtained point; and comparing the determined distance to a distance-based threshold.

6. Image processing apparatus, comprising:
   apparatus for capturing image data from a sequence of images of a scene from different but repeatable viewpoints, being a mobile platform arranged to travel over a repeating path; and
   one or more processors, the one or more processors being programmed to:
   associate captured images with a respective viewpoint identification based on a position of the mobile platform when the captured image was captured;
   track a region of interest in the sequence of images;
   perform an eigenspace projection for respective images of the sequence to calculate respective points in the eigenspace projection; and
   compare a calculated point to a point previously obtained for a reference image for a same viewpoint;
   wherein a change between a calculated point and a corresponding previously obtained point indicates a change in image content of the region of interest between a corresponding captured image and a corresponding reference image for the substantially same viewpoint.

7. Apparatus according to claim 6, wherein the processor for performing the eigenspace projection comprises:
   means for using a model space created by performing Principal Component Analysis.

8. Apparatus according to claim 7, wherein means for performing Principal Component Analysis comprises:
   means for using Singular Value Decomposition.

9. Apparatus according to claim 6, wherein the change is detected by:
   means for determining a distance in the eigenspace projection between the calculated point and the corresponding previously obtained point, and comparing the determined distance to a distance-based threshold.

10. A computer program or plurality of computer programs on a non-transitory computer readable medium:
    capturing image data from a sequence of images of a scene from different but repeatable viewpoints, from a mobile platform on a repeating path;
    associating captured images with a respective viewpoint identification based on a position of the mobile platform when the image was captured;
    tracking a region of interest in the sequence of images;
    performing an eigenspace projection for respective images of the sequence to calculate respective points in the eigenspace projection; and
    comparing a calculated point to a point previously obtained for a reference image for a same viewpoint;
    wherein a change between a calculated point and a corresponding previously obtained point indicates a change in image content of the region of interest between a corresponding captured image and a corresponding reference image for the same viewpoint.

* * * * *